United States Patent
Omori et al.

(10) Patent No.: US 12,225,202 B2
(45) Date of Patent: Feb. 11, 2025

(54) ENCODING METHOD, ENCODING APPARATUS, AND PROGRAM

(71) Applicant: Nippon Telegraph and Telephone Corporation, Tokyo (JP)

(72) Inventors: Yuya Omori, Musashino (JP); Ken Nakamura, Musashino (JP); Daisuke Kobayashi, Musashino (JP); Hiroe Iwasaki, Musashino (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 158 days.

(21) Appl. No.: 17/796,528

(22) PCT Filed: Feb. 25, 2020

(86) PCT No.: PCT/JP2020/007453
§ 371 (c)(1),
(2) Date: Jul. 29, 2022

(87) PCT Pub. No.: WO2021/171360
PCT Pub. Date: Sep. 2, 2021

(65) Prior Publication Data
US 2023/0053579 A1    Feb. 23, 2023

(51) Int. Cl.
*H04N 19/119*    (2014.01)
*H04N 19/137*    (2014.01)
*H04N 19/176*    (2014.01)
*H04N 19/96*    (2014.01)

(52) U.S. Cl.
CPC ......... *H04N 19/137* (2014.11); *H04N 19/176* (2014.11); *H04N 19/96* (2014.11)

(58) Field of Classification Search
CPC .................................................. H04N 19/119
See application file for complete search history.

(56) References Cited

U.S. PATENT DOCUMENTS

2017/0208336 A1* 7/2017 Li ..................... H04N 19/119

FOREIGN PATENT DOCUMENTS

| JP | 2015-027022 | 2/2015 |
| WO | WO 2019/070683 | 4/2019 |
| WO | WO 2020/000019 | 1/2020 |

OTHER PUBLICATIONS

Bross et al., "Versatile Video Coding (Draft 7)," JVET-P2001-v9, Oct. 2019, 491 pages.
Gao et al., "Non-CE1: Relation Between QT/BT/TT Split Constraint syntax elements," JVET-L0217, Oct. 2018, 4 pages.

* cited by examiner

*Primary Examiner* — Jeffery A Williams
(74) *Attorney, Agent, or Firm* — Fish & Richardson P.C.

(57) ABSTRACT

A coding method is a coding method executed by a coding apparatus. The coding method includes partitioning a first block having a predetermined size in an original image into a group of second blocks each being a block serving as a unit for coding, by quad tree, ternary tree, or binary tree, and predicting movement for each of the second blocks. The partitioning includes first sub-partitioning and second sub-partitioning, the first sub-partitioning includes partitioning the first block into blocks each having a size selected from sizes determined according to the quad tree, the ternary tree, or the binary tree, and the second sub-partitioning includes further partitioning the blocks each having the selected size to generate the second blocks.

6 Claims, 9 Drawing Sheets

ENCODING METHOD, ENCODING APPARATUS, AND PROGRAM

CROSS-REFERENCE TO RELATED APPLICATIONS

This application is a National Stage application under 35 U.S.C. § 371 of International Application No. PCT/JP2020/007453, having an International Filing Date of Feb. 25, 2020, the disclosure of which is considered part of the disclosure of this application, and is incorporated by reference in its entirety into this application.

TECHNICAL FIELD

The present disclosure relates to a encoding method, a encoding apparatus, and a program.

BACKGROUND ART

Many coding standards such as Moving Picture Experts Group (MPEG)-2, MPEG-4, and MPEG-4/Advanced Video Coding (AVC) are employed for a video coding standard. In recent years. High Efficiency Video Coding (HEVC)/H. 265, which is the latest video coding standard, has been widely used.

Now, Versatile Video Coding (VVC)/H. 266 is currently proposed for the video coding standard following the HEVC. The VVC has been proposed with an aim that the coding efficiency of the VVC reaches twice the coding efficiency of the HEVC.

In the video coding standards such as the HEVC and the VVC, frames of a moving image are partitioned into blocks each being a unit called a coding tree unit (CTU). In the HEVC, the maximum size of the CTU is "64×64". On the other hand, in the VVC, the maximum size of the CTU is "128×128". The size of each CTU in a slice defined in a frame is constant.

Each CTU in the frame is recursively partitioned into blocks each being a unit for coding referred to as coding unit (CU). The CU is a unit for coding processing including prediction processing and transformation processing. In the HEVC and the VVC, it is possible to select a different size for each CU. An increase in degree of freedom of the size of the CU results in improvement in coding efficiency.

Recursive repetition of a quad tree partitioning for a CTU yields a CU of the HEVC. In the HEVC, the size of the CU is "64×64", "32×32", "16×16", and "8×8". In the HEVC, the CTU is configured from a combination of CUs having these sizes.

In contrast, in the VVC, a block partitioning scheme called "QTTTBT" has been proposed for a new block partitioning scheme for the CU (see NPD 1). A "QTTTBT" scheme algorithm is an algorithm forming the backbone of the VVC.

Similarly to a CU in the HEVC, a CU in the VVC may be partitioned by quad tree (QT) (hereinafter referred to as "QT"). The CU in the VVC may be partitioned by binary tree (BT) (hereinafter referred to as "BT") for partitioning the CU horizontally or vertically into two equal parts. The CU in the VVC may be partitioned by ternary tree (TT) (hereinafter referred to as "TT") for partitioning the CU into three equal parts at a horizontal or vertical width ratio of "1:2:1". Hereinafter, the quad tree partitioning is referred to as "QT partitioning". The horizontal or vertical ternary tree partitioning is referred to as "TT partitioning". The horizontal or vertical binary tree partitioning is referred to as "BT partitioning".

In the VVC, recursive execution of QT partitioning for a CTU (block) yields each CU in the CTU. The horizontal or vertical BT partitioning or TT partitioning is recursively executed for each CU thus yielded.

Thus, in the VVC, it is possible to flexibly select the size of the CU by the "QTTTBT" scheme compared to the HEVC or the like. That is, not only a square but also various sizes of a rectangle, such as "32×4" and "8×16" may be selected for the size of the CU (block). An intra-image prediction (intra prediction) is performed for each CU described above. The size of the CU is flexibly selected depending on the characteristics and design of an original image, and thus, it is possible to expect a significant increase in coding efficiency in the VVC compared to the HEVC or the like.

CITATION LIST

Non Patent Document

NPD 1: Benjamin Bross, Jianle Chen, Shan Liu, Ye-Kui Wang, "Versatile Video Coding (Draft 7)". JVET-P2001-v9.

SUMMARY OF THE INVENTION

Technical Problem

However, the number of combinations of the sizes of CUs (partition patterns of a CTU) according to the "QTTTBT" scheme is enormous compared to the number of combinations of the sizes of CUs in the HEVC. Thus, an enormous amount of computation is required in order for the coding apparatus to evaluate and compare all of the partition patterns and to select a highly evaluated partition pattern.

Thus, in processing for selecting the size of the CU, a method of adaptively narrowing choices of a partitioned shape of the CU by utilizing a partition result of a CU adjacent to the CU may be contemplated. However, the degree of reduction in computation amount due to the narrowed choices is different for each CU, and thus, the amount of computation for each CTU including CUs is not constant. In a case where a coding apparatus including a circuit with a fixed amount of computation is designed, or in a case where coding needs to be executed reliably at a certain processing speed, it is not appropriate that the computation amount for each CTU is not constant.

In selecting the size of the CU, it is necessary that the optimal size of the CU is selected for each candidate CU size as a result of the intra-image prediction (intra prediction), derivation of a rate distortion (RD) cost value, and evaluation of the RD cost value being executed. However, an increase in type of prediction modes in the intra-image prediction and adoption of multiple reference lines (MRIs) in an image greatly increases the amount of computation for prediction processing for each CU in the VVC compared to the amount of computation for prediction processing in the HEVC. When an increase in amount of computation for selecting the size of the CU and an increase in amount of computation for prediction processing of each CU are combined, the amount of computation in the VVC greatly increases compared to the amount of computation in the HEVC to apply a heavy load to the coding processing of the VVC.

As described above, the VVC has an enormous amount of computation for the processing for selecting the size of each CU partitioning the CTU, unfortunately.

In view of the above circumstances, an object of the present disclosure is to provide a coding method, a coding apparatus, and a program capable of preventing an amount of computation for selecting a size of each CU partitioning a CTU from increasing more than necessary.

Means for Solving the Problem

One aspect of the present disclosure is a coding method executed by a coding apparatus. The coding method includes partitioning a first block having a predetermined size in an original image into a group of second blocks each being a block serving as a unit for coding, by quad tree, ternary tree, or binary tree, and predicting movement for each of the second blocks. The partitioning includes first sub-partitioning and second sub-partitioning. The first sub-partitioning includes partitioning the first block into blocks each having a size selected from sizes determined according to the quad tree, the ternary tree, or the binary tree. The second sub-partitioning includes further partitioning the blocks each having the selected size to generate the second blocks.

An aspect of the present disclosure is a coding apparatus including a partition unit that partitions a first block having a predetermined size in an original image into a group of second blocks each being a block serving as a unit for coding, by quad tree, ternary tree, or binary tree, and a prediction unit that predicts movement for each of the second blocks. The partition unit includes a first sub-partition unit and a second sub-partition unit. The first sub-partition unit partitions the first block into blocks each having a size selected from sizes determined according to the quad tree, the ternary tree, or the binary tree. The second sub-partition unit further partitions the blocks each having the selected size to generate the second blocks.

One aspect of the present disclosure is a program causing a computer to operate as a coding apparatus for executing the coding method.

Effects of the Invention

According to the present disclosure, it is possible to prevent an amount of computation for selecting a size of each CU partitioning a CTU from increasing more than necessary.

DESCRIPTION OF EMBODIMENTS

Embodiments of the present disclosure will be described in detail with reference to the drawings.

First Embodiment

Figure 1:
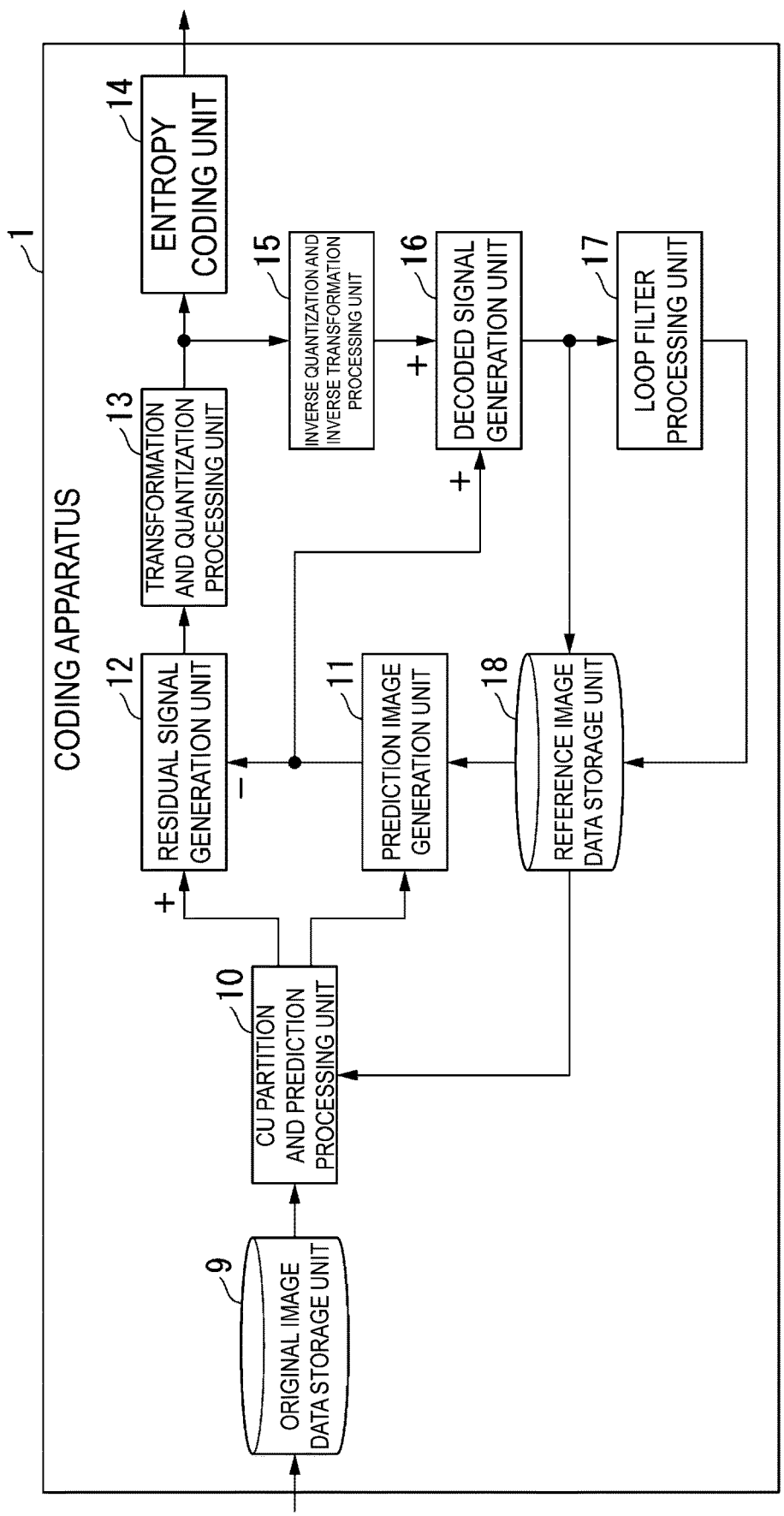
FIG. 1 is a diagram illustrating an example of a configuration of a coding apparatus according to a first embodiment.

FIG. 1 is a diagram illustrating a configuration example of a coding apparatus (encoding apparatus) 1. The coding apparatus 1 is an apparatus for coding (encoding) a moving image. The coding apparatus 1 includes an original image data storage unit 9, a CU partition and prediction processing unit 10, a prediction image generation unit 11, a residual signal generation unit 12, a transformation and quantization processing unit 13, an entropy coding unit 14, an inverse quantization and inverse transformation processing unit 15, a decoded signal generation unit 16, a loop filter processing unit 17, and a reference image data storage unit 18.

Figure 2:
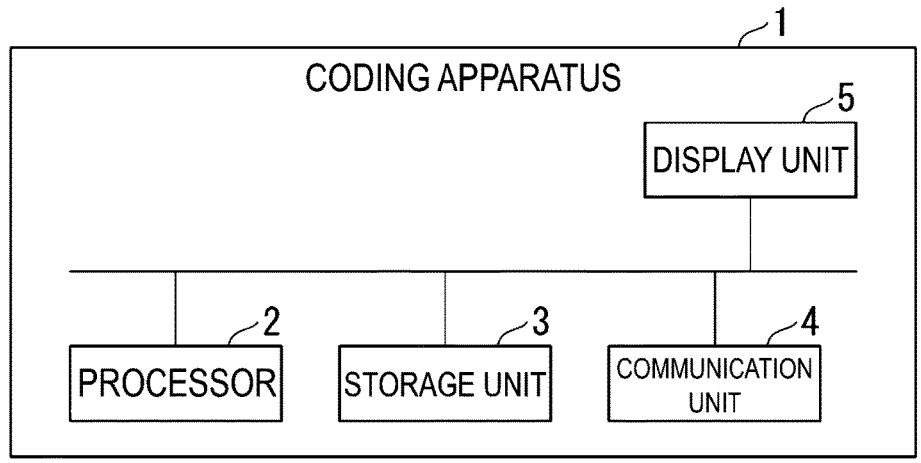
FIG. 2 is a diagram illustrating an example of a hardware configuration of the coding apparatus according to the first embodiment.

FIG. 2 is a diagram illustrating an example of a hardware configuration of the coding apparatus 1. The coding apparatus 1 includes a processor 2, a storage unit 3, a communication unit 4, and a display unit 5.

Some or all of the CU partition and prediction processing unit 10, the prediction image generation unit 11, the residual signal generation unit 12, the transformation and quantization processing unit 13, the entropy coding unit 14, the inverse quantization and inverse transformation processing unit 15, the decoded signal generation unit 16, and the loop filter processing unit 17 are implemented as software as a result of the processor 2 such as a central processing unit (CPU) executing a program stored in the storage unit 3 including a non-volatile recording medium (non-transitory recording medium). The program may be recorded on a computer-readable recording medium. The computer-readable recording medium is a portable medium such as a flexible disk, a magneto-optical disc, a read only memory (ROM), and a compact disc read only memory (CD-ROM) or a non-temporary recording medium such as a storage device such as a hard disk provided in a computer system. The communication unit 4 may receive the program via a communication line. The communication unit 4 may transmit a result of coding via a communication line. The display unit 5 is, for example, a liquid crystal display. The display unit 5 displays a moving image including an original image.

Some or all of the CU partition and prediction processing unit 10, the prediction image generation unit 11, the residual signal generation unit 12, the transformation and quantization processing unit 13, the entropy coding unit 14, the inverse quantization and inverse transformation processing unit 15, the decoded signal generation unit 16, and the loop filter processing unit 17 may be implemented by using hardware including an electronic circuit (or circuitry) using a large scale integration circuit (LSI), an application specific integrated circuit (ASIC), a programmable logic device (PLD), or a field programmable gate array (FPGA), for example.

The coding apparatus 1 acquires, from an external apparatus (not illustrated), a signal of a moving image (original image) to be coded, for each CTU being a basic unit for coding processing. In the VVC, the coding apparatus 1 acquires an original image having a maximum size of "128×128" pixels, in the order of CTU numbers, from the external apparatus (not illustrated). The coding apparatus 1 codes the moving image, based on a parameter specified by the external apparatus (not illustrated). The coding apparatus 1 outputs coded data (coded bit stream) to the external apparatus (not illustrated).

The CU partition and prediction processing unit 10 executes processing for each CTU, below. The prediction image generation unit 11, the residual signal generation unit 12, the transformation and quantization processing unit 13, the entropy coding unit 14, the inverse quantization and inverse transformation processing unit 15, the decoded signal generation unit 16, and the loop filter processing unit 17 execute processing for each CU, below.

Next, the coding apparatus 1 will be described in detail.

The original image data storage unit 9 acquires and stores moving image data serving as an original image from an external apparatus (not illustrated). The moving image data serving as the original image includes an original image of a CTU to be coded. The CU partition and prediction processing unit 10 (partition unit) (partitioner) acquires the original image of the CTU to be coded from the original image data storage unit 9. The CU partition and prediction processing unit 10 acquires, from the reference image data storage unit 18, reference image data (a decoded signal) used in processing for predicting movement of the image.

The CU partition and prediction processing unit 10 executes selecting the size of a CU and selecting a prediction mode of each CU, for the original image of the CTU to be coded. The CU partition and prediction processing unit 10 partitions the original image of the CTU into one or more CUs. Here, the CU partition and prediction processing unit 10 executes processing for partitioning the CTU to be coded into CUs in "n" stages (n is an integer of from 2 to the number of the stages). That is, the CU partition and prediction processing unit 10 executes processing for selecting the size of each CU in the CTU from candidates in n stages.

The CU partition and prediction processing unit 10 executes intra-image prediction processing (selection of a prediction mode) of the CU having the selected size by using the reference image data for each CU.

As described above, for example, the CU partition and prediction processing unit 10 selects the size "16×8" of the CU at the coordinates (0, 0) in the CTU and the prediction mode "DC" in such a CU. The CU partition and prediction processing unit 10 outputs, for each CU, the size selected for the size of the CU and the prediction mode of such a CU to the prediction image generation unit 11. The CU partition and prediction processing unit 10 outputs the original image of each CU having the selected size to the residual signal generation unit 12.

The prediction image generation unit 11 (prediction unit) acquires, for each CU, the size selected for the size of the CU and the prediction mode of such a CU as prediction result data, from the CU partition and prediction processing unit 10. The prediction image generation unit 11 acquires the reference image data (decoded signal) used in the processing for predicting movement of the image, from the reference image data storage unit 18. The prediction image generation unit 11 generates a prediction image, based on the prediction result data, with reference to the reference image data. The prediction image generation unit 11 outputs the prediction image for each CU to the residual signal generation unit 12 and the decoded signal generation unit 16.

The residual signal generation unit 12 acquires the original image of each CU having the selected size from the CU partition and prediction processing unit 10. The residual signal generation unit 12 acquires the prediction image of each CU from the prediction image generation unit 11. The residual signal generation unit 12 derives a difference between the original image and the prediction image for each CU. The residual signal generation unit 12 outputs the difference derived as a prediction residual signal of the CU to the transformation and quantization processing unit 13.

The transformation and quantization processing unit 13 applies an orthogonal transformation such as a discrete cosine transform to the prediction residual signal. The transformation and quantization processing unit 13 quantizes a transformation coefficient being an orthogonal transformation result. The transformation and quantization processing unit 13 outputs the quantized transformation coefficient to the entropy coding unit 14 and the inverse quantization and inverse transformation processing unit 15.

The entropy coding unit 14 acquires the quantized transformation coefficient from the transformation and quantization processing unit 13. The entropy coding unit 14 executes entropy coding on the quantized transformation coefficient. The entropy coding unit 14 outputs, as a coded stream, an execution result of the entropy coding to the external apparatus (not illustrated).

The inverse quantization and inverse transformation processing unit 15 acquires the quantized transformation coefficient from the transformation and quantization processing unit 13. The inverse quantization and inverse transformation processing unit 15 applies inverse quantization and inverse orthogonal transformation to the quantized transformation coefficient. The inverse quantization and inverse transformation processing unit 15 outputs, as a decoded signal of a prediction residual, execution results of the inverse quantization and the inverse orthogonal transformation to the decoded signal generation unit 16.

The decoded signal generation unit 16 acquires the decoded signal of the prediction residual from the inverse quantization and inverse transformation processing unit 15. The decoded signal generation unit 16 acquires a prediction signal for each CU from the prediction image generation unit 11. The decoded signal generation unit 16 generates the decoded signal of the CU to be coded by adding the decoded signal of the prediction residual and the prediction signal. The decoded signal generation unit 16 outputs the decoded signal of the CU to be coded, to the loop filter processing unit 17. The decoded signal generation unit 16 records the decoded signal of the CU to be coded into the reference image data storage unit 18.

The loop filter processing unit 17 acquires the decoded signal of the CU to be coded from the decoded signal generation unit 16. The loop filter processing unit 17 applies filtering processing (loop filter processing) for reducing a coding distortion in the decoded signal of the CU to be coded. The loop filter processing unit 17 records the filtered image as reference image data into the reference image data storage unit 18.

The reference image data storage unit 18 stores the decoded signal of the CU to be coded. The reference image data storage unit 18 stores the filtered image as reference image data.

Next, an overview of the CU partition and prediction processing unit 10 will be described.

Figure 3:
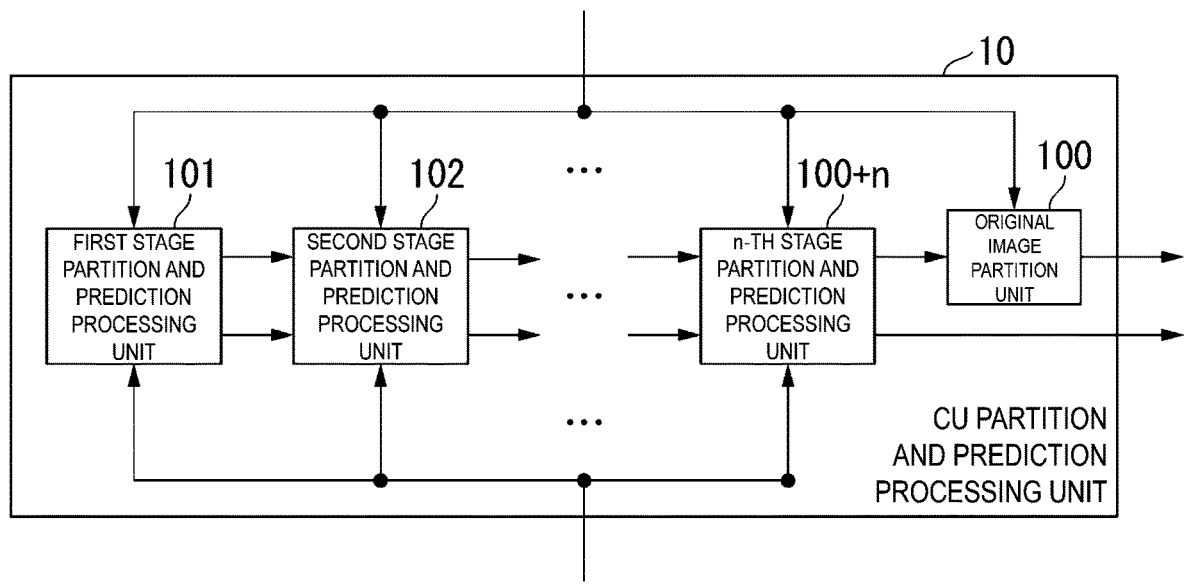
FIG. 3 is a diagram illustrating an example of a configuration of a CU partition and prediction processing unit according to the first embodiment.

FIG. 3 is a diagram illustrating an example of a configuration of the CU partition and prediction processing unit 10. The CU partition and prediction processing unit 10 acquires an original image of a CTU to be coded from the original image data storage unit 9. The CU partition and prediction processing unit 10 acquires, from the reference image data storage unit 18, reference image data (a decoded signal) used in processing for predicting movement of the image. The CU partition and prediction processing unit 10 executes partition processing (division processing) and prediction processing at each stage of from a first stage to an n-th stage.

The CU partition and prediction processing unit 10 includes an original image partition unit 100 and n stage partition and prediction processing units. That is, the CU partition and prediction processing unit 10 includes the original image partition unit 100, and a first stage partition and prediction processing unit 101 to an n-th stage partition and prediction processing unit (100+n).

The first stage partition and prediction processing unit 101 (a first sub-partition unit (first sub-partitioner) for a second stage partition and prediction processing unit 102) acquires the original image of the CTU to be coded from the original image data storage unit 9. The first stage partition and prediction processing unit 101 acquires, from the reference image data storage unit 18, reference image data (a decoded signal) used in processing for predicting movement of the image.

The first stage partition and prediction processing unit 101 selects, based on the reference image data, a selection result (a partition result of the CTU) of the size of a CU in the original image of the CTU and a prediction mode of each CU. The first stage partition and prediction processing unit 101 outputs the selection result (the partition result at the first stage) of the size of each CU at the first stage and the prediction mode of each CU at the first stage, to the second stage partition and prediction processing unit 102 (the next stage of the first stage partition and prediction processing unit 101).

The second stage partition and prediction processing unit 102 (a second sub-partition unit (second sub-partitioner) for the first stage partition and prediction processing unit 101) (a first sub-partition unit for a third stage partition and prediction processing unit) acquires an original image of a CTU to be coded, from the original image data storage unit 9. The second stage partition and prediction processing unit 102 acquires, from the reference image data storage unit 18, reference image data (a decoded signal) used in processing for predicting movement of the image. The second stage partition and prediction processing unit 102 acquires the selection result (the partition result at the first stage) of the size of each CU at the first stage and the prediction mode of each CU at the first stage, from the first stage partition and prediction processing unit 101.

The second stage partition and prediction processing unit 102 selects, based on the prediction mode of each CU at the first stage and the selection result (the partition result at the first stage) of the size of each CU at the first stage partition and prediction processing unit 101 (the previous stage), a selection result of the size of a CU in the original image of the CTU and a prediction mode of each CU. That is, the second stage partition and prediction processing unit 102 uses, as an assumption, the selection result of the size of each CU at the previous stage to update the selection result of the size of the CU in the original image of the CTU and the prediction mode of each CU. The second stage partition and prediction processing unit 102 outputs the selection result of the size of each CU (the partition result at the second stage) and the prediction mode of each CU at the second stage, to the third stage partition and prediction processing unit (next stage).

Thus, an n-th (n≥2) stage partition and prediction processing unit (100+n) outputs an updated result of a selection result (a partition result) of the size of each CU and an updated result of a prediction mode of each CU at an (n−1)-th stage, to an "n+1"-th stage partition and prediction processing unit (100+(n+1)).

The n-th stage partition and prediction processing unit (100+n) at a final stage (a second sub-partition unit for a stage partition and prediction processing unit at the previous stage) acquires a selection result of the size of each CU (a partition result at the "n−1"-th stage) and the prediction mode of each CU at the "n−1"-th stage from an "n−1"-th stage partition and prediction processing unit (100+(n−1)).

The n-th stage partition and prediction processing unit (100+n) at the final stage selects a selection result of the size of the CU in the original image of the CTU at the n-th stage and a prediction mode of each CU at the n-th stage, based on the selection result (partition result) of the size of each CU in the "n−1"-th stage partition and prediction processing unit (100+(n−1)) and the prediction mode of each CU at the "n−1"-th stage.

The n-th stage partition and prediction processing unit (100+n) at the final stage outputs the selection result (partition result) of the size of each CU at the n-th stage, as a final size of each CU for partitioning the CTU to be coded (a partition pattern of the CTU), to the original image partition unit 100. The n-th stage partition and prediction processing unit (100+n) at the final stage outputs the prediction mode (final prediction mode) of each CU at the n-th stage to the prediction image generation unit 11 and the residual signal generation unit 12.

The original image partition unit 100 acquires the selection result of the size of each CU (the partition result at the n-th stage being the final stage) from the n-th stage partition and prediction processing unit (100+n) at the final stage. The original image partition unit 100 partitions the original image of the CTU into the original image of each CU, based on the selection result of the size of each CU (the partition pattern of the CTU). The original image partition unit 100 outputs the original image, for each CU, to the residual signal generation unit 12. Thus, the CU partition and prediction processing unit 10 outputs a combination of the original image and the prediction mode, for each CU, to the residual signal generation unit 12.

The prediction image generation unit 11 acquires, as prediction result data, the combination of the original image and the prediction mode, from the CU partition and prediction processing unit 10. The prediction image generation unit 11 refers to the reference image data to generate, on the basis of the prediction result data, the prediction image for each CU.

Figure 4:
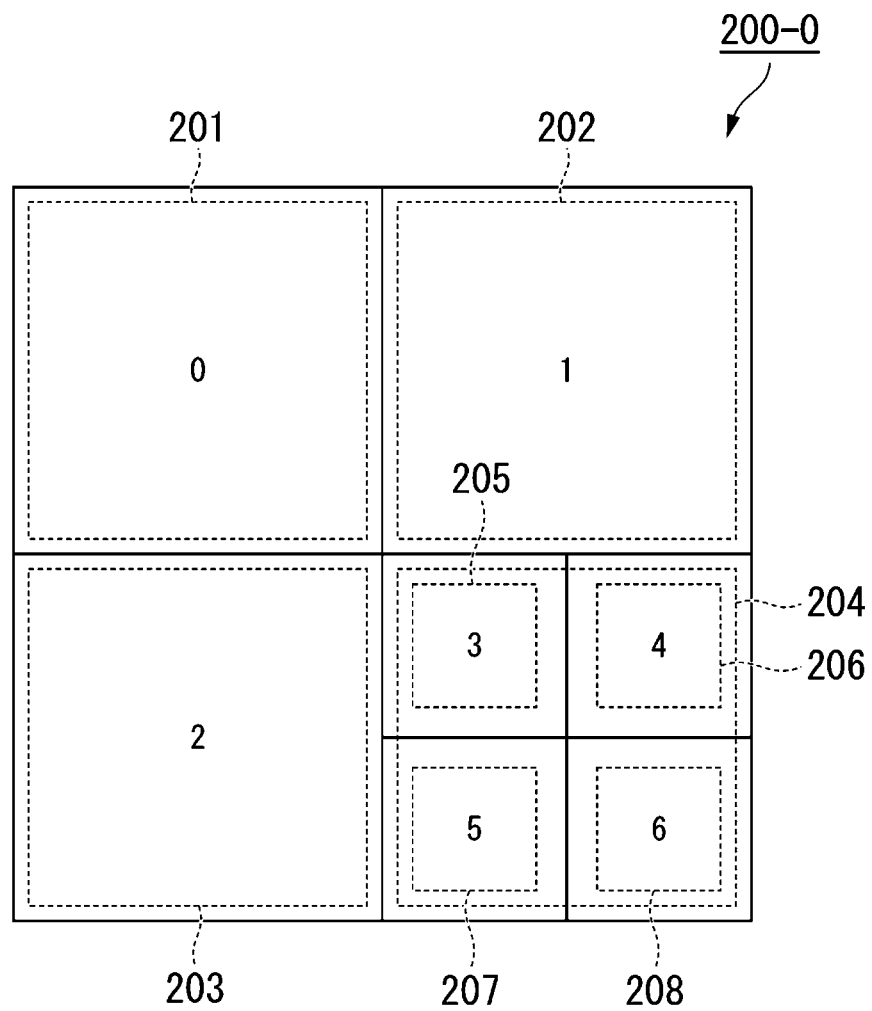
FIG. 4 is a diagram illustrating an example of a partition result at a first stage according to the first embodiment.

Next, the CU partition and prediction processing unit 10 will be described in detail. FIG. 4 is a diagram illustrating an example of the partition result at the first stage (the selection result of the size of each CU at the first stage). The first stage partition and prediction processing unit 101 uses QT partitioning, BT partitioning, or TT partitioning to select an optimal partition pattern so as to minimize an RD cost value. The first stage partition and prediction processing unit 101 uses only the QT partitioning, in one example, to select an optimum partition pattern so as to minimize the RD cost value.

In FIG. 4, the CTU is QT partitioned into seven blocks including from CU0 to CU6 (seven blocks including from a block 201 to a block 203 and from a block 205 to a block 208). At the first stage, the QT partitioning only is used, and thus, similarly to a CTU in the HEVC, the CTU (a block 200-0) illustrated in FIG. 4 includes only square blocks. The CU partition and prediction processing unit 10 outputs a selection result (a partition result at the first stage) of the size of each CU at the first stage to the second stage partition and prediction processing unit 102.

At the first stage, similarly to the HEVC, the partition pattern is selected by using the QT only. Thus, at the first stage, an optimal partition pattern is determined by only the square CUs (blocks). Thus, compared to processing for selecting an original partition pattern in the VVC, the amount of computation at the first stage in the first embodiment significantly reduces.

At each stage of the second stage onward, any of no partitioning, the BT partitioning, and the TT partitioning is selected once for each CU generated up to the previous stage. As a result, the number of combination patterns of block partitioning is reduced, and therefore, the amount of computation (processing amount) is fixed.

The second stage partition and prediction processing unit 102 selects once any of no partitioning, the BT partitioning, and the TT partitioning for each block generated as the selection result (the partition result at the first stage) of the size of each CU at the first stage. In FIG. 4, the second stage partition and prediction processing unit 102 selects once any of no partitioning, the BT partitioning, and the TT partitioning for each of the blocks including from the block 201 to the block 203 and from the block 205 to the block 208.

Figure 5:
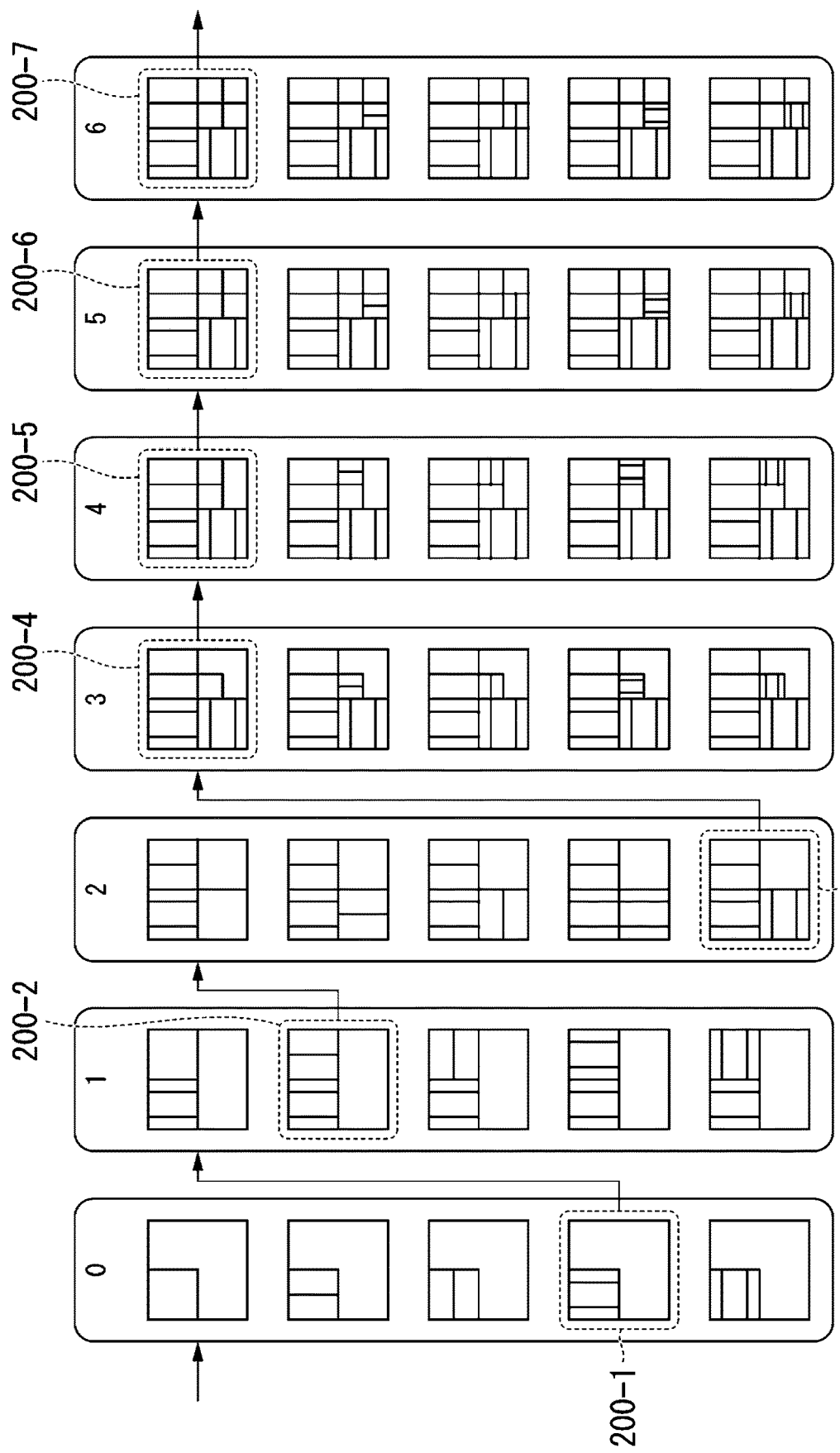
FIG. 5 is a diagram illustrating an example of partition processing at a second stage according to the first embodiment.

FIG. 5 is a diagram illustrating an example of partition processing at the second stage. The order of coding of a CU is the order from the "CU0" to the "CU6" illustrated in FIG. 4 (the order from the block 201 to the block 203, and the order from the block 205 to the block 208). Such an order remains unchanged even if each CU is further partitioned. The second stage partition and prediction processing unit 102 selects a CU in the order from the "CU0" to the "CU6". The second stage partition and prediction processing unit 102 selects once any of no partitioning, the BT partitioning, and the TT partitioning for the selected CU.

For example, the second stage partition and prediction processing unit 102 derives an RD cost value for each partition pattern of five partition patterns including no partitioning, a vertical BT partitioning (hereinafter, referred to as "BTv partitioning"), a horizontal BT partitioning (hereinafter, referred to as "BTh partitioning"), a vertical TT partitioning (hereinafter, referred to as "TTv partitioning"), and a horizontal TT partitioning (hereinafter, referred to as "TTh partitioning").

The amount of computation in the prediction processing is proportional to the area of a block. Thus, the amount of computation at each stage of the second stage onward is five times the amount of computation in a case where one partition pattern is attempted for the entire CTU and is unfailingly a constant computation amount. Thus, even if the CU partition and prediction processing unit 10 is implemented by using hardware (a circuit) having a fixed amount of computation, the CU partition and prediction processing unit 10 is capable of executing the processing for selecting the size (the processing for partitioning a CTU). The CU partition and prediction processing unit 10 is capable of ensuring to code a CU at a fixed speed.

The second stage partition and prediction processing unit 102 selects a partition pattern for minimizing an RD cost value, for the "CU0" in the block 201. In FIG. 5, the second stage partition and prediction processing unit 102 selects the TTv partitioning for the "CU0" in the block 201, as illustrated in a block 200-1. With the TTv partitioning, the "CU0" is vertically partitioned at a horizontal width ratio of "1:2:1".

The second stage partition and prediction processing unit 102 selects a partition pattern for minimizing the RD cost value, for the "CU1" in the block 202 under the condition (precondition) in which the TTv partitioning is selected for the "CU0" in the block 201. In FIG. 5, the second stage partition and prediction processing unit 102 selects the BTv partitioning for the "CU1" in the block 202, as illustrated in a block 200-2.

The second stage partition and prediction processing unit 102 selects a partition pattern for minimizing the RD cost value for the "CU2" in the block 203 under the condition that the TTv partitioning is selected for the "CU0" in the block 201 and the BTv partitioning is selected for the "CU1" in the block 202. In FIG. 5, the second stage partition and prediction processing unit 102 selects the TTh partitioning for the "CU2" in the block 203, as illustrated in a block 200-3. With the TTh partitioning, the "CU2" is horizontally partitioned at a vertical width ratio of "1:2:1".

The second stage partition and prediction processing unit 102 similarly selects a partition pattern for minimizing the RD cost value in the order of the "CU3" in the block 205, the "CU4" in the block 206, the "CU5" in the block 207, and the "CU6" in the block 208. That is, the second stage partition and prediction processing unit 102 updates the selection result of the size of the CU in the original image of the CTU. The second stage partition and prediction processing unit 102 outputs the selection result of the size of each CU (the partition result at the second stage) to the third stage partition and prediction processing unit (next stage).

Figure 6:
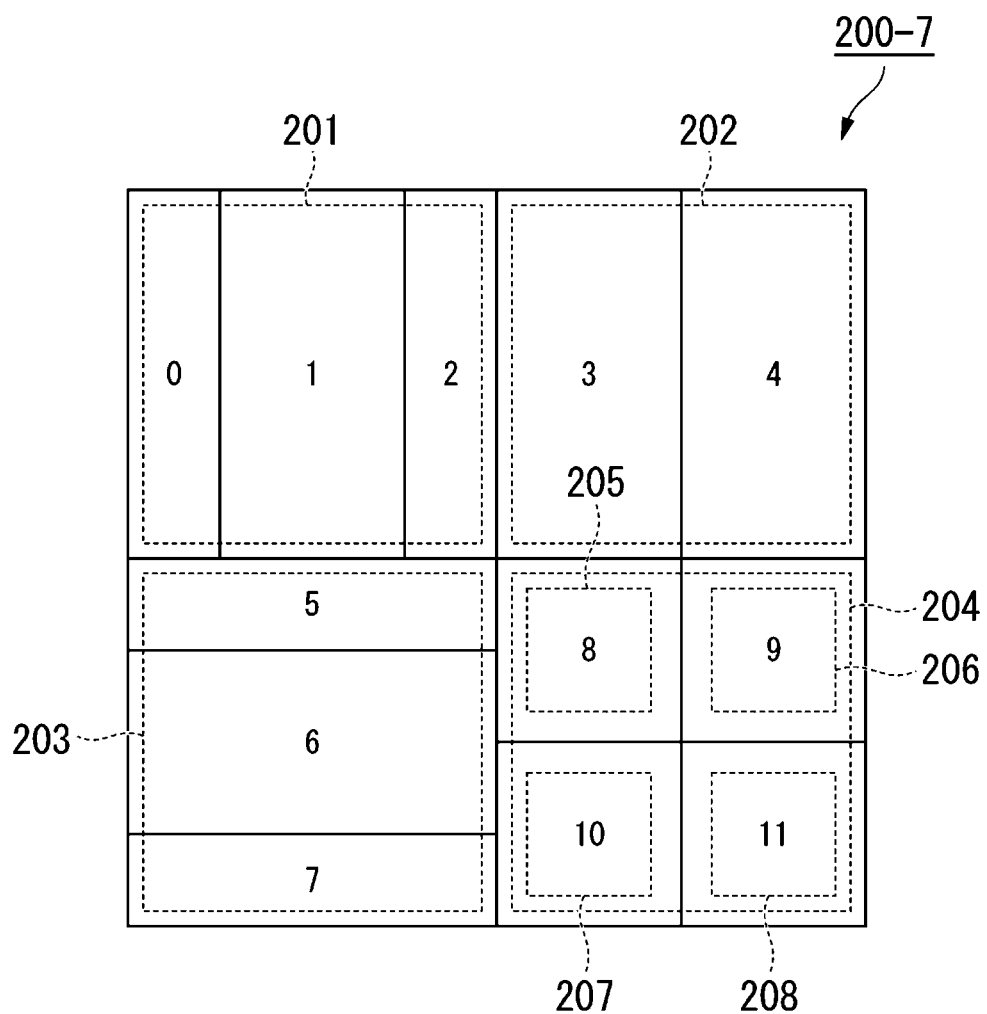
FIG. 6 is a diagram illustrating an example of a partition result at the second stage according to the first embodiment.

FIG. 6 is a diagram illustrating an example of the partition result at the second stage. In a block 200-7 representing the partition result at the second stage of the CTU, the block 200-1 is TTv partitioned into a CU0, a CU1, and a CU2. The block 200-2 is BTv partitioned into a CU3 and a CU4. The block 200-3 is TTh partitioned into a CU5, a CU6, and a CU7. A block 200-4 is QT partitioned into a CU8, a CU9, a CU10, and a CU11. Thus, the n-th (n>2) stage partition and prediction processing unit (100+n) selects a partition pattern for minimizing the RD cost value, for each CU.

Figure 7:
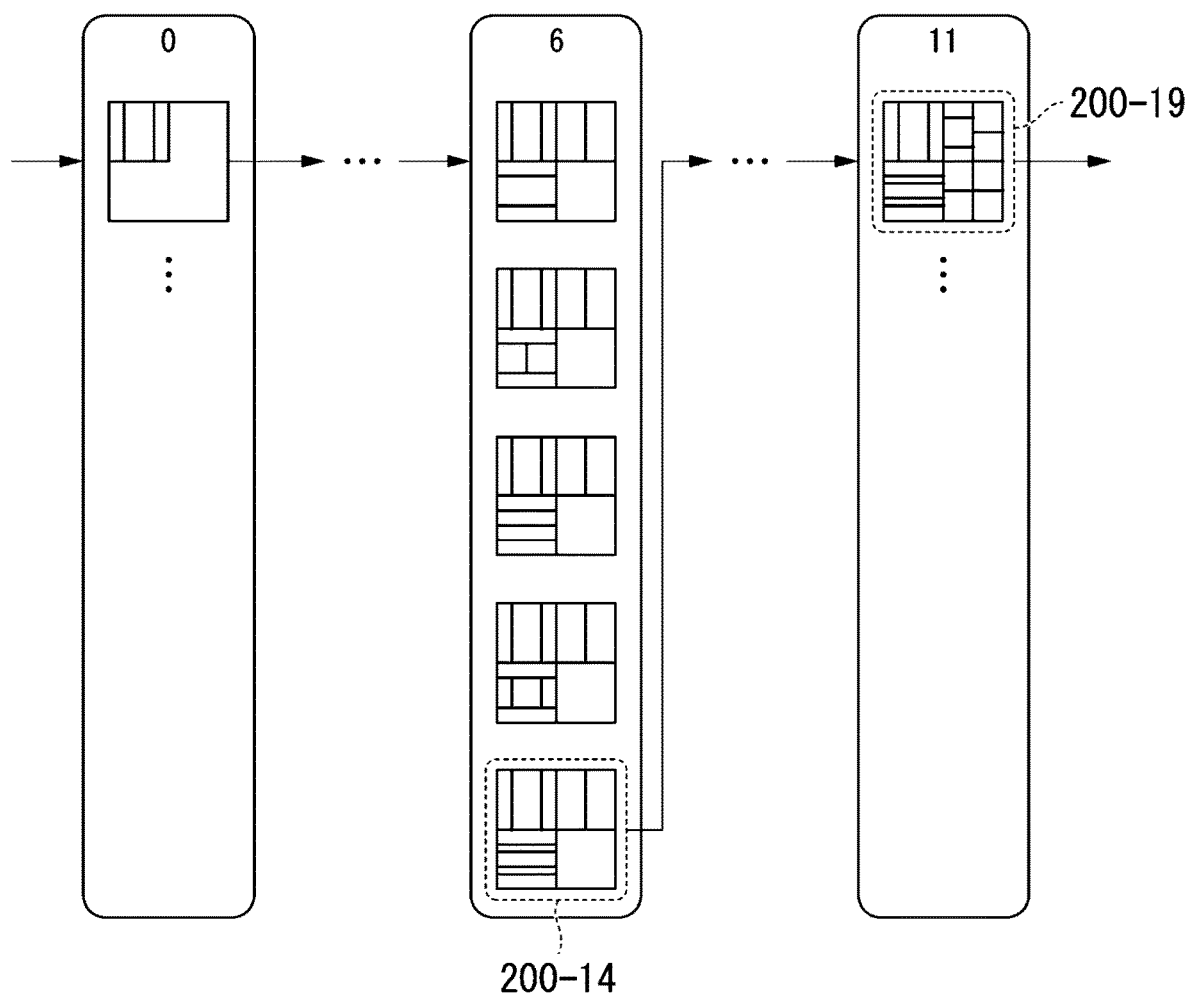
FIG. 7 is a diagram illustrating an example of partition processing at a third stage according to the first embodiment.

FIG. 7 is a diagram illustrating an example of partition processing at the third stage. The order of coding of a CU is the order from the "CU0" to the "CU11" illustrated in FIG. 6 (the order from the block 201 to the block 203, and the order from the block 205 to the block 208). Such an order remains unchanged even if each CU is further partitioned at any stage of the fourth stage onward. The third stage partition and prediction processing unit (100+3) selects a CU in the order from the "CU0" to the "CU11". The third stage partition and prediction processing unit (100+3) selects once any of no partitioning, the BT partitioning, and the TT partitioning, for the selected CU.

For example, a partition pattern for minimizing the RD cost value is selected for the "CU6" illustrated in FIG. 6 under the conditions of the selection result (partition result) of the size of each of from the "CU0" to the "CU5". In FIG. 6, the third stage partition and prediction processing unit (100+3) selects the TTh partitioning for the "CU6" in the block 202, as illustrated in a block 200-14. In FIG. 6, the third stage partition and prediction processing unit (100+3) selects no partitioning for the "CU11" in the block 204, as illustrated in a block 200-19. Thus, the third stage partition and prediction processing unit (100+3) updates the selection result of the size of the CU in the original image of the CTU.

Figure 8:
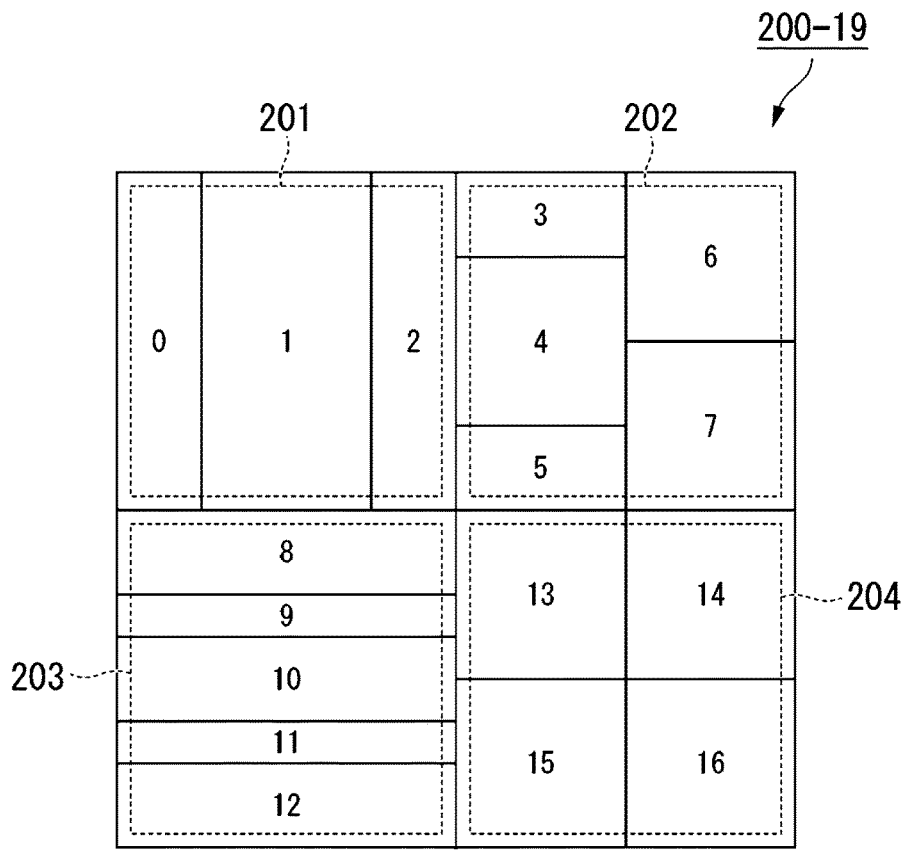
FIG. 8 is a diagram illustrating an example of a partition result using a partition pattern based on a QTTTBT scheme according to the first embodiment.

FIG. 8 is a diagram illustrating an example of a partition result using a partition pattern according to the QTTTBT scheme. When the final stage is, for example, the third stage, the third stage partition and prediction processing unit (100+3) outputs the selection result (partition result at the third stage) of the size of each CU illustrated in the block 200-19 to the original image partition unit 100. The original image partition unit 100 partitions the original image of the CTU into the original image of each CU, on the basis of the selection result of the size of each CU (the partition result at the third stage).

Thus, the partition pattern of the CTU is not finalized at one time but is selected (provisionally finalized) and updated in a stepwise manner, and therefore, the amount of computation required for finalizing the partition pattern is greatly reduced.

Figure 9:
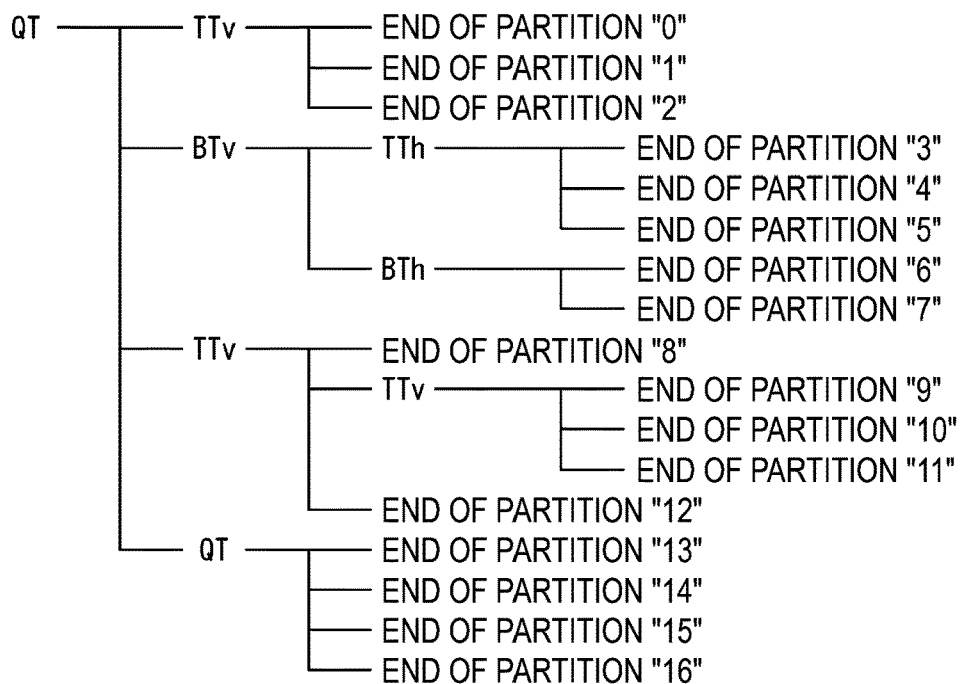
FIG. 9 is a diagram illustrating an example of a structure of a partitioning tree according to the first embodiment.

FIG. 9 is a diagram illustrating an example of a structure (flag information) of a partitioning tree. The "CU0", the "CU1", and the "CU2" illustrated in FIG. 8 may be expressed as "QT-TTv-end of partition". The "CU3", the "CU4", and the "CU5" illustrated in FIG. 8 may be expressed as "QT-BTv-TTh-end of partition". The "CU6" and the "CU7" illustrated in FIG. 8 may be expressed as "QT-BTv-BTh-end of partition". The "CU8" illustrated in FIG. 8 may be expressed as "QT-TTh-end of partition". The "CU9", the "CU10", and the "CU11" illustrated in FIG. 8 may be expressed as "QT-TTh-TTh-end of partition". The "CU12" illustrated in FIG. 8 may be expressed as "QT-TTv-end of partition". The "CU13", the "CU14", and the "CU15" illustrated in FIG. 8 may be expressed as "QT-QT-end of partition".

In the processing described above, it is possible to greatly reduce the amount of computation. However, in the processing described above, partial optimization in the CTU is repeated, and therefore, compared to a case where a gross optimization in the CTU is executed by finalizing a partition pattern at one time, a change in partition pattern and a slight deterioration in coding performance according to such a change may occur.

One possible cause of the deterioration in coding performance may include an excessively minute partition of the CTU at the first stage. Only the QT is used at the first stage to derive the optimal partition pattern, and thus, the QT partitioning may possibly be executed for a larger count than the original count of the QT partitioning in the VVC. As a result, the BT partitioning and the TT partitioning may not be likely to be selected at each stage of the second stage onward.

In order to suppress such an influence, a maximum value may be set to the partition count of the CTU at the first stage. For example, if the partition count larger than seven for partitioning from the "CU0" to the "CU6" is reached at the first stage, the QT partitioning is ensured not to be executed three or more times at the first stage by setting the maximum value of the count of the QT partitioning to "2". As a result, it is possible to suppress the CU from being partitioned excessively minutely at the first stage.

In the processing described above, the size of a CU in the CTU is optimized only by the QT partitioning for the CU at the first stage, and no partitioning, the BT partitioning, or the TT partitioning is selected once for each CU at the second stage onward. On the other hand, the size of the CU may be optimized by the QT partitioning or the BT partitioning at the first stage, and the TT partitioning may be selected once for each CU at the second stage onward. The size of the CU may be optimized by the QT partitioning or the BT partitioning at the first stage, and the BT partitioning or the TT partitioning may be selected once for each CU at the second stage onward.

Next, narrowing of choices of the prediction mode will be described. In intra-image prediction of the VVC, 67 kinds of intra prediction modes including from "0" to "66" are selectable. In the intra-image prediction of the VVC, the concept of multiple reference lines (MRIs) is added in comparison to the HEVC. In the MRI, a reference pixel used for the intra-image prediction may be selected from among reference pixels in three kinds of lines, that is, nearest zero lines, one line forward, and three lines forward.

Figure 10:
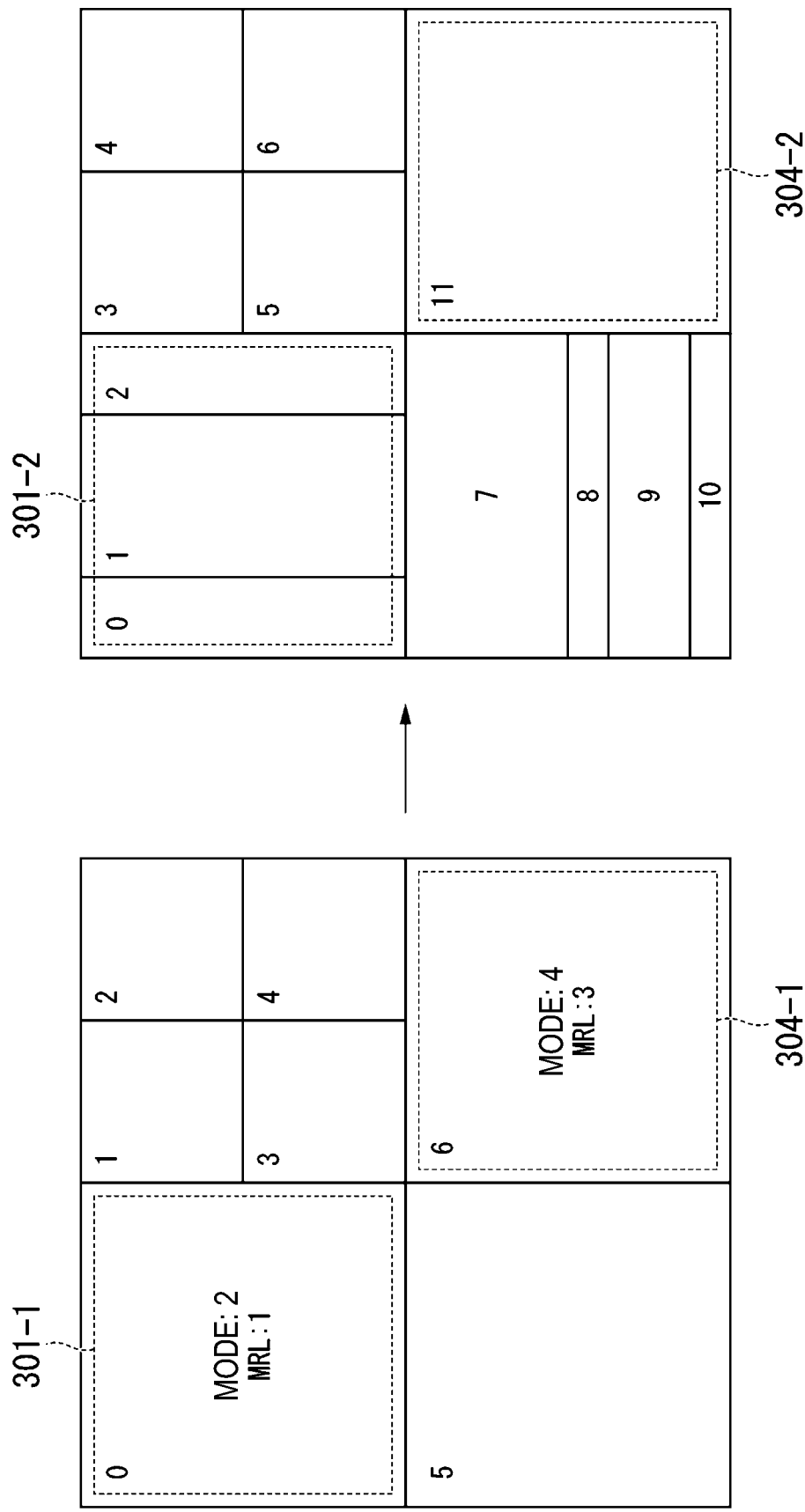
FIG. 10 is a diagram illustrating examples of an intra prediction mode and MRL at the first stage and an intra prediction mode and MRl, at the second stage according to the first embodiment.

FIG. 10 is a diagram illustrating examples of the intra prediction modes and the MRLs at the first stage and the intra prediction modes and the MRLs at the second stage. On the left side of FIG. 10, the size of each CU, optimal intra prediction modes and the MRL numbers obtained when the first stage is completed are illustrated. At the first stage, predetermined prediction processing is used to select an intra prediction mode for each CU from among the 67 kinds of the intra prediction modes including from "0" to "66". At the first stage, predetermined prediction processing is used to select a reference pixel of the intra-image prediction for each CU, from among the reference pixels in three kinds of lines, that is, the nearest zero lines, the one line forward, and the three line forward.

In a "CU0" in a block 301-1, the optimal intra prediction mode is "2" and the optimal MRL is "1". In the "CU6" in a block 304-1, the optimal intra prediction mode is "4" and the optimal MRI, is "3".

On the right side of FIG. 10, the size of each CU, optimal intra prediction modes and the MRL numbers obtained when the second stage subsequent to the first stage is completed are illustrated. At the first stage, any partitioning of no partitioning, the BTv partitioning, the BTh partitioning, the TTv partitioning, and the TTh partitioning is selected for each CU. In the prediction processing during the selection, only the optimal intra prediction mode in the CU at the first stage is attempted. Only the optimal MRL number in the CU at the first stage is attempted.

For example, in selecting the partition of a block 301-2 at the second stage (the "CU0" of the block 301-1 at the first stage), the RD cost value in "intra prediction mode=2, MRL=1" is derived for each partition pattern of no partitioning, the BTv partitioning, the BTh partitioning, the TTv partitioning, and the TTh partitioning. The partitioning allowing for obtaining the minimum cost value among the five partition patterns is selected as the partition pattern of the CU at the second stage.

For example, in selecting the partition of a block 304-2 at the second stage (the "CU6" of the block 304-1 at the first stage), the RD cost value in "intra prediction mode=4, MRL=3" is derived for each partition pattern of no partitioning, the BTv partitioning, the BTh partitioning, the TTv partitioning, and the TTh partitioning. The partitioning allowing for obtaining the minimum cost value among the five patterns is selected as the partition pattern of the CU at the second stage.

In the processing described above, in processing for narrowing the choices of the prediction mode, the partition pattern is added and finalized. It is possible to greatly reduce the amount of computation of the prediction processing in the processing for narrowing the choices of the prediction mode. The choices of the attempted prediction mode are narrowed on the basis of the optimal prediction mode of the CU at the previous stage, and thus, it is possible to prevent deterioration in coding performance.

In the above processing, only the optimal prediction mode of the CU and the MRL of the CU at the previous stage are attempted at the next stage, but a plurality of prediction modes and MRIs with small RD cost values at the previous stage (a plurality of prediction modes and MRLs at a higher level) may be attempted at the next stage. For example, when the results of the prediction processing of the "CU0" at the first stage in the ascending order of the RD cost values are "intra prediction mode=2, MRL=1", "intra prediction mode=5, MRL=0)", "intra prediction mode=4, MRL=0", and "intra prediction mode=5, MRI. =3", upper three sets of the prediction mode and the MRI, may be attempted in the ascending order of the RD cost value, that is, "intra prediction mode=2, MRL=1", "intra prediction mode=5, MRL=0", and "intra prediction mode=4. MRL=0" at the second stage. Thus, when the RD cost values of the pattern of the three prediction modes are derived for each of the five partition patterns and are compared for evaluation, the optimal partition pattern may be finalized.

Figure 11:
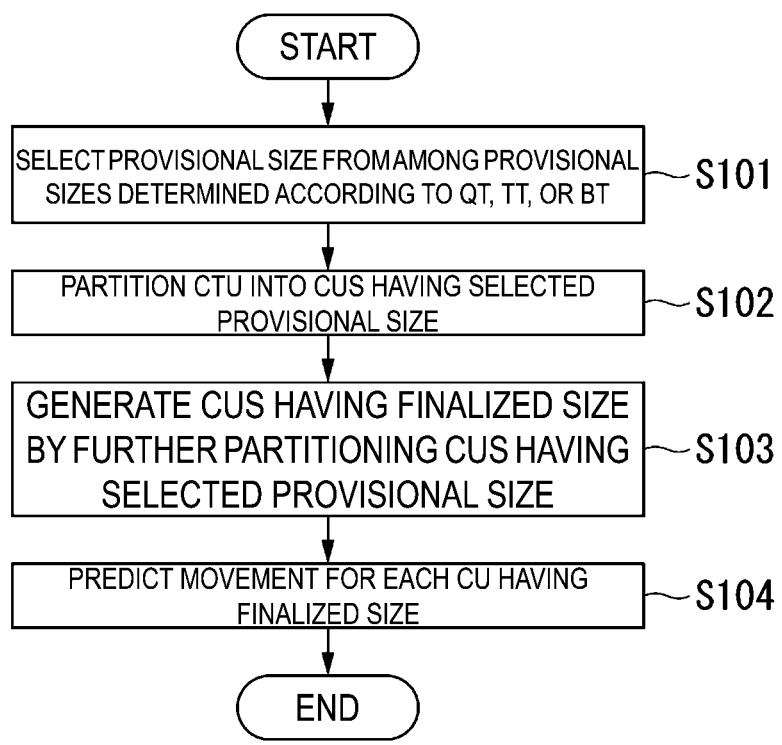
FIG. 11 is a flowchart illustrating an example of an operation of the coding apparatus according to the first embodiment.

Next, an example of an operation of the coding apparatus 1 will be described. FIG. 11 is a flowchart illustrating an example of an operation of the coding apparatus 1. The CU partition and prediction processing unit 10 selects a provisional size on the basis of the RD cost, for example, from among provisional sizes determined according to the QT, the TT, or the BT (step S101). The CU partition and prediction processing unit 10 partitions a CTU into CUs each having the selected provisional size (step S102). The CU partition and prediction processing unit 10 generates CUs each having a finalized size by further partitioning the CUs each having the selected provisional size (step S103).

The prediction image generation unit 11 predicts movement of an image for each CU having the finalized size (step S104).

Thus, the CU partition and prediction processing unit 10 (partition unit) partitions the CTU (first block) having the predetermined size in the original image, into a group of CUs (second blocks) each being a block serving as a unit for coding, by the quad tree (QT), the ternary tree (TT), or the binary tree (BT). The CU partition and prediction processing unit 10 (partition unit) includes the first sub-partition unit (for example, the first stage partition and prediction processing unit 101 and the second stage partition and prediction processing unit 102) and the second sub-partition unit (for example, the second stage partition and prediction processing unit 102 and the third stage partition and prediction processing unit). The first sub-partition unit partitions the CTU (first block) into blocks each having a size (provisional size) selected from among sizes determined according to the quad tree (QT), the ternary tree (TT), or the binary tree (BT). The second sub-partition unit generates CUs (second blocks) by further partitioning the blocks each having the selected size (provisional size). The prediction image generation unit 11 (prediction unit) predicts movement of an image for each CU (second block).

Thus, the CU partition and prediction processing unit 10 generates the CU having the finalized size by further partitioning the CU having the selected provisional size. As a result, it is possible to prevent an amount of computation for selecting the size of each CU partitioning the CTU from increasing more than necessary.

That is, the CU partition and prediction processing unit 10 provisionally finalizes the partition pattern of the CU in a stepwise manner. The CU partition and prediction processing unit 10 repeats partial optimization processing in the provisional finalization of the partition pattern of the CU. As a result, the CU partition and prediction processing unit 10 is capable of reducing the amount of computation to finalize the partition pattern of the CU. The prediction image generation unit 11 executes diverting, omitting, and switching, for example, each prediction processing data according to the finalized result of the partition pattern of the CU to reduce the finalization processing of the partition pattern of the CU and the amount of computation of the prediction processing along with the finalization processing in the coding apparatus 1.

Second Embodiment

A second embodiment is different from the first embodiment in that instead of the size of each CU at the first stage being limited by the partition patterns (QT, BT, and TT), the size of each CU at the first stage is limited to a prescribed size. In the second embodiment, differences from the first embodiment will be mainly described.

Partitioning of a block will be described.

In the second embodiment, a combination of the size of each CU included in the CTU at the first stage is a combination of prescribed sizes having more kinds than the kinds of the partition patterns (QT, BT, and TT). The kinds of the prescribed sizes include six kinds including, for example, "8×8", "16×16", "16×32", "32×16", "32×32", and "64×64", which are larger than the kinds of the partition patterns (QT, BT, and TT) in the first embodiment.

The size of each CU at the second stage onward in the second embodiment is selected on the basis of the partition pattern, similarly to the size of each CU at the second stage onward in the first embodiment. That is, the size of each CU at the second stage onward in the second embodiment is selected once for each CU on the basis of no partitioning or the size of the BT or TT. The size of each CU at the second stage onward in the second embodiment may be selected once for each CU on the basis of no partitioning or the size of the TT.

The partition pattern needs to be used to express the coded data. Thus, the first stage partition and prediction processing unit 101 executes recalculation processing for expressing, by using the partition pattern, the partition pattern of the CTU expressed by using a group of prescribed sizes.

Next, the prediction mode will be described.

In the second embodiment, unlike the first embodiment, the choices of the prediction mode are not narrowed in a stepwise manner, but the prediction mode is refined in a stepwise manner. 1. Value (number) of MRL It is assumed that, at the first stage, the first stage partition and prediction processing unit 101 uses only "MRL=0" to execute the prediction processing. It is assumed that, at an "n−1"-th (the number of stages >n≥3) stage, the "n−1"-th stage partition and prediction processing unit uses "MRL=0 or 1" to execute the prediction processing. It is assumed that, at the n-th stage being the final stage, the n-th stage partition and prediction processing unit (100+n) uses "MRL=0, 1, or 3" to execute the prediction processing.

Here, there is often a complete difference between a partition pattern at from the first stage to a stage within a predetermined range (hereinafter referred to as "initial stage") and a partition pattern at the final stage. Thus, at the initial stage, the "n−1"-th (the number of stages >>n) stage partition and prediction processing unit uses "MRL=0, 1, or 3" to execute extra less-accurate prediction processing.

So, at the first stage with less accuracy, the first stage partition and prediction processing unit 101 uses MRI, having one of 0, 1, and 3 to execute less-accurate prediction processing to select the initial partition pattern of the CTU (the initial size of each CU). As the final stage is approaching, an n-th (>2) stage partition and prediction processing unit increases the kinds of the MRI to three. Further, the n-th (>2) stage partition and prediction processing unit uses the three kinds of the MRL to execute accurate prediction processing. These allows the n-th (≥2) stage partition and prediction processing unit to efficiently select the finalized partition pattern (the finalized size of each CU) with a small amount of computation.

2. Prediction Mode Value (Number)

At the first stage, the first stage partition and prediction processing unit 101 executes the prediction processing by using some of 67 modes. For example, the first stage partition and prediction processing unit 101 executes the prediction processing by using a prediction mode with directionalities being thinned out every eight directions (each prediction mode assigned with a mode number of 0, 1, 2, 10, 18, 26, 34, 42, 50, and 58). The first stage partition and prediction processing unit 101 selects a prediction mode (optimal prediction mode) for minimizing the RD cost value.

At the second stage, the second stage partition and prediction processing unit 102 executes the prediction processing by using the prediction mode assigned with a mode number in the vicinity of a mode number assigned to the mode selected by the first stage partition and prediction processing unit 101. For example, the second stage partition and prediction processing unit 102 executes the prediction processing by using the prediction mode assigned with a mode number of "±4" (6, 7, 8, 9, 10, 11, 12, 13, 14) around the mode number "10" assigned to the prediction mode selected by the first stage partition and prediction processing unit 101.

Here, there is often a complete difference between the partition pattern at the initial stage and the partition pattern at the final stage. Thus, at the first stage with less accuracy, the first stage partition and prediction processing unit 101 executes the less-accurate prediction processing to select the initial partition pattern of the CTU (the initial size of each CU). As the final stage is approaching, the n-th (≥2) stage partition and prediction processing unit increases a step width of the mode number to execute accurate prediction processing. These allows the n-th (≥2) stage partition and prediction processing unit to efficiently select the finalized partition pattern (the finalized size of each CU) with a small amount of computation.

Thus, the CU partition and prediction processing unit 10 (partition unit) partitions the CTU (first block) having a first predetermined size in the original image into a group of CUs (second blocks) each being a block serving as a unit for coding, by a group of second predetermined sizes (for example, four or more sizes selected from "8×8", "16×16", "16×32", "32×16", "32×32", and "64×64"). The CU partition and prediction processing unit 10 (partition unit) includes the first sub-partition unit (for example, the first stage partition and prediction processing unit 101 and the second stage partition and prediction processing unit 102) and the second sub-partition unit (for example, the second stage partition and prediction processing unit 102 and the third stage partition and prediction processing unit). The first sub-partition unit partitions the CTU (first block) into blocks each having a size (provisional size) selected from among the group of the second sizes. The second sub-partition unit generates CUs (second blocks) by further partitioning the blocks each having the selected size (provisional size). The prediction image generation unit 11 (prediction unit) predicts movement for each CU (second block).

Thus, the size of the CU at the first stage is limited to sizes (prescribed sizes) determined more flexibly than the partition patterns (QT, BT, and TT). As a result, the amount of computation for selecting the size of each CU partitioning the CTU may be more flexibly prevented from increasing more than necessary.

Although the embodiment of the present disclosure has been described in detail with reference to the drawings, a specific configuration is not limited to the embodiment, and a design or the like in a range that does not depart from the gist of the present disclosure is included.

INDUSTRIAL APPLICABILITY

The present disclosure may be applied to an apparatus for coding a moving image.

REFERENCE SIGNS LIST

1 . . . . Coding apparatus
2 . . . . Processor
3 . . . . Storage unit
4 . . . . Communication unit
5 . . . Display unit
10 . . . CU partition and prediction processing unit
11 . . . . Prediction image generation unit
12 . . . . Residual signal generation unit
13 . . . . Transformation and quantization processing unit
14 . . . . Entropy coding unit
15 . . . Inverse quantization and inverse transformation processing unit
16 . . . . Decoded signal generation unit
17 . . . . Loop filter processing unit
18 . . . . Reference image data storage unit
100 . . . . Original image partition unit
101 . . . . First stage partition and prediction processing unit
102 . . . . Second stage partition and prediction processing unit
200 . . . . CTU
201 to 208 . . . . Block
301 . . . . Block
304 . . . . Block

The invention claimed is:

1. A coding method executed by a coding apparatus comprising at least one processor or at least one circuit, the method comprising:
   partitioning a first block having a predetermined size in an original image into a group of second blocks each being a block serving as a unit for coding, by quad tree, ternary tree, or binary tree; and
   predicting movement for each of the second blocks,
   wherein the partitioning includes first sub-partitioning and second sub-partitioning,
   the first sub-partitioning includes partitioning a whole of the first block by any one of the quad tree, the ternary tree, or the binary tree,
   the second sub-partitioning includes further partitioning, by any one of the quad tree, the ternary tree, or the binary tree not selected in the first sub-partitioning, parts of the first block partitioned, to generate the second blocks, and
   the predicting includes executing accurate prediction processing for each of the second blocks by progressively increasing the kinds of multiple reference lines to three as a final stage of the partitioning is approaching.

2. The coding method according to claim 1, wherein the second sub-partitioning includes further partitioning results of partitioning the parts of the first block by any one of the quad tree, the ternary tree, or the binary tree not selected in the first sub-partitioning.

3. The coding method according to claim 1, wherein the first sub-partitioning includes partitioning the first block by the quad tree.

4. A coding apparatus, comprising:
a partitioner configured to partition a first block having a predetermined size in an original image into a group of second blocks each being a block serving as a unit for coding, by quad tree, ternary tree, or binary tree; and
a predictor configured to predict movement for each of the second blocks,
wherein the partitioner includes a first sub-partitioner and a second sub-partitioner,
the first sub-partitioner partitions a whole of the first block by any one of the quad tree, the ternary tree, or the binary tree,
the second sub-partitioner further partitions, by any one of the quad tree, the ternary tree, or the binary tree not selected in the first sub-partitioner, parts of the first block partitioned, to generate the second blocks, and
the predicting includes executing accurate prediction processing for each of the second blocks by progressively increasing the kinds of multiple reference lines to three as a final stage of the partitioning is approaching,
wherein each of the partitioner, the first sub-partitioner and the second sub-partitioner is implemented by:
i) computer executable instructions executed by at least one processor,
ii) at least one circuit or
iii) a combination of computer executable instructions executed by at least one processor and at least one circuit.

5. A non-transitory computer readable medium storing a program causing a computer to operate as a coding apparatus for executing the coding method according to claim 1.

6. The coding method according to claim 1, wherein the first sub-partitioning includes selecting one reference pixel from among reference pixels in three kinds of lines.

* * * * *